(12) United States Patent
Sato et al.

(10) Patent No.: US 11,657,982 B2
(45) Date of Patent: *May 23, 2023

(54) SOLID ELECTROLYTIC CAPACITOR

(71) Applicant: Nippon Chemi-Con Corporation, Tokyo (JP)

(72) Inventors: Kenta Sato, Tokyo (JP); Masao Sakakura, Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/272,330

(22) PCT Filed: Sep. 13, 2019

(86) PCT No.: PCT/JP2019/036186
§ 371 (c)(1),
(2) Date: Feb. 28, 2021

(87) PCT Pub. No.: WO2020/059672
PCT Pub. Date: Mar. 26, 2020

(65) Prior Publication Data
US 2021/0335553 A1 Oct. 28, 2021

(30) Foreign Application Priority Data
Sep. 21, 2018 (JP) .............................. JP2018-177343

(51) Int. Cl.
*H01G 9/028* (2006.01)
*H01G 9/035* (2006.01)
(Continued)

(52) U.S. Cl.
CPC ............. *H01G 9/028* (2013.01); *H01G 9/035* (2013.01); *H01G 9/052* (2013.01); *H01G 9/145* (2013.01); *H01G 9/15* (2013.01)

(58) Field of Classification Search
CPC ........ H01G 9/052; H01G 9/028; H01G 9/035; H01G 9/145; H01G 9/15
See application file for complete search history.

(56) References Cited

U.S. PATENT DOCUMENTS

2010/0085686 A1   4/2010   Sugihara et al.
2011/0164348 A1   7/2011   Merker et al.
(Continued)

FOREIGN PATENT DOCUMENTS

CN   112106157 A   12/2020
EP   3 826 041 A1   5/2021
(Continued)

OTHER PUBLICATIONS

International Search Report from International Patent Application No. PCT/JP2019/036186, dated Nov. 26, 2019.
(Continued)

*Primary Examiner* — David M Sinclair
(74) *Attorney, Agent, or Firm* — Potomac Law Group, PLLC (57) ABSTRACT

In a solid electrolytic capacitor having an electrolyte layer consisting of a solid electrolyte layer and a liquid, the solid electrolytic capacitor, which suppresses a dedoping reaction and which ESR thereof does not keenly increase, in particular, after a loading of heat stress, is provided. In the solid electrolytic capacitor, the electrolyte layer is formed in the capacitor element which is formed by opposing an anode foil and a cathode foil. This electrolyte layer includes the solid electrolyte layer and the liquid. The solid electrolyte layer includes a conductive polymer consisting of a dopant and a conjugated polymer. The liquid is filled in air gaps in the capacitor element on which the solid electrolyte layer is formed. The electrolyte layer includes ammonia as a cation component, and a molecular ratio of the cation component relative to 1 mol of a functional group which can contribute
(Continued)

to a doping reaction of the dopant, in the electrolyte layer is 23 or less.

16 Claims, 6 Drawing Sheets (51) Int. Cl.
    *H01G 9/15*         (2006.01)
    *H01G 9/052*       (2006.01)
    *H01G 9/145*       (2006.01)

(56) References Cited

U.S. PATENT DOCUMENTS

| | | | |
|---|---|---|---|
| 2015/0332857 A1* | 11/2015 | Ishimaru | H01G 9/06 361/524 |
| 2016/0336117 A1* | 11/2016 | Koseki | H01G 9/151 |
| 2017/0256362 A1* | 9/2017 | Tsubaki | H01G 9/028 |
| 2018/0240601 A1 | 8/2018 | Aoyama et al. | |
| 2019/0006111 A1* | 1/2019 | Tsubaki | H01G 9/15 |
| 2020/0203081 A1* | 6/2020 | Saito | H01G 9/145 |
| 2021/0142952 A1 | 5/2021 | Sato et al. | |

FOREIGN PATENT DOCUMENTS

| | | |
|---|---|---|
| JP | 2006-114540 A | 4/2006 |
| JP | 2011-527513 A | 10/2011 |
| JP | 2018-110233 A | 7/2018 |
| WO | WO 2009/001707 A1 | 12/2008 |
| WO | WO 2017/090241 A1 | 6/2017 |

OTHER PUBLICATIONS

Office Action dated Sep. 30, 2021, in Chinese Patent Application No. 201980043776.2.

Office Action dated Dec. 8, 2021, in European Patent Application No. 19 863 351.3.

Extended European search report dated Apr. 26, 2022, in European Patent Application No. 19 863 351.3.

Office Action dated Apr. 21, 2022, in Chinese Patent Application No. 201980043776.2.

* cited by examiner

SOLID ELECTROLYTIC CAPACITOR

FIELD OF INVENTION

The present disclosure relates to a solid electrolytic capacitor.

BACKGROUND

In electrolytic capacitors utilizing valve action metal such as tantalum and aluminum, etc., by making the valve action metal as the anode electrode into shapes of a sintered body or an etching foil, etc., to enlarge the surface of dielectric, the electrolytic capacitors can be in a small size and have a large capacity. In particular, a solid electrolyte capacitor in which the dielectric oxide film is covered by the solid electrolyte is in a small size, has a large capacity, is a low equivalent series resistor, and is required for downsizing, high functionality, and reducing cost thereof.

As solid electrolytes, manganese dioxide, 7,7,8,8-tetracyanoquinodimetane (TCNQ) complex, etc., are known. In recent years, conductive polymers which are derived from monomers having n conjugated double bonds, such as poly(3,4-ethylenedioxythiophene) which has slow reaction speed and which has excellent adhesion to the dielectric oxide film, etc., are rapidly becoming common as solid electrolyte. For the conductive Polyanions such as organic sulfonic acid, etc., are used as a dopant at the time of chemical oxidative polymerization or electrolytic oxidative polymerization, and high conductivity is expressed.

However, compared to a liquid electrolytic capacitor in which the capacitor element is impregnated with the electrolytic solution and which does not have the solid electrolyte layer, the solid electrolytic capacitor lacks function of repairing the defective portion of the dielectric oxide film, and there is a consideration that the leakage current increases. Accordingly, a so-called hybrid-type solid electrolytic capacitor in which the solid electrolyte layer is formed on the capacitor element, in which the anode foil and the cathode foil is facing each other, while impregnating the air gaps of the capacitor element with the electrolytic solution is getting attention.

Furthermore, this hybrid-type solid electrolytic capacitor is getting attention in the point that Equivalent Series Resistor (ESR) thereof is less affected by the electrical conductivity of the electrolytic solution. Generally, ESR of the electrolytic capacitor using only electrolytic solution as the electrolyte is easily affected by the electrical conductivity of the electrolytic solution, and ESR tends to increase as the electrical conductivity of the electrolytic solution gets lower. However, ESR of the electrolytic capacitor including the solid electrolyte layer and the electrolytic solution is less affected by the electrical conductivity of the electrolytic solution. In other words, ESR of the product can be made sufficiently small even when the electrical conductivity of the electrolytic solution is low. The reason for this is because the electrical conductivity of the conductive polymer used in the solid electrolytic capacitor is incomparably higher compared to the electrical conductivity of the electrolytic solution, such that the electrical conductivity of the conductive polymer greatly affect ESR.

PRIOR ART DOCUMENT

Patent Document

Patent Document 1: Japanese Patent Application 2006-114540

SUMMARY OF INVENTION

Problems to be Solved by Invention

However, in the solid electrolytic capacitor which uses the combination of the solid electrolyte and the electrolytic solution, the conductivity thereof gets worse by the dedoping reaction of the dopants and ESR of the solid electrolytic capacitor increases. Regarding this increase in ESR along with the dedoping reaction, Patent Document 1 reports that the dedoping reaction can be suppressed by the excessive acids in the molecular ratio of the acid component and the base component that are the solute component of the electrolytic solution. This report assumes that the dedoping reaction is suppressed because the equilibrium of the dopant that is the acid component and the acid component in the electrolytic solution is maintained.

However, the heat stress may be given to the solid electrolytic capacitor, for example, when the solid electrolytic capacitor is used under the high temperature environment (for example, 115° C. or more), or in the reflow soldering process to apply the solid electrolytic capacitor to the substrate. This heat stress facilitates the dedoping reaction even when the solute component in the electrolytic solution is acid excessive. Therefore, ESR of the solid electrolytic capacitor keenly increases after the loading of the heat stress.

The present disclosure is suggested to address the above problem and the objective is to provide the solid electrolytic capacitor which ESR thereof does not keenly increase even after the loading of the heat address, among the solid electrolytic capacitor which has solid electrolytes and the solution as the electrolyte.

Means to Solve the Problem

Figure 1:
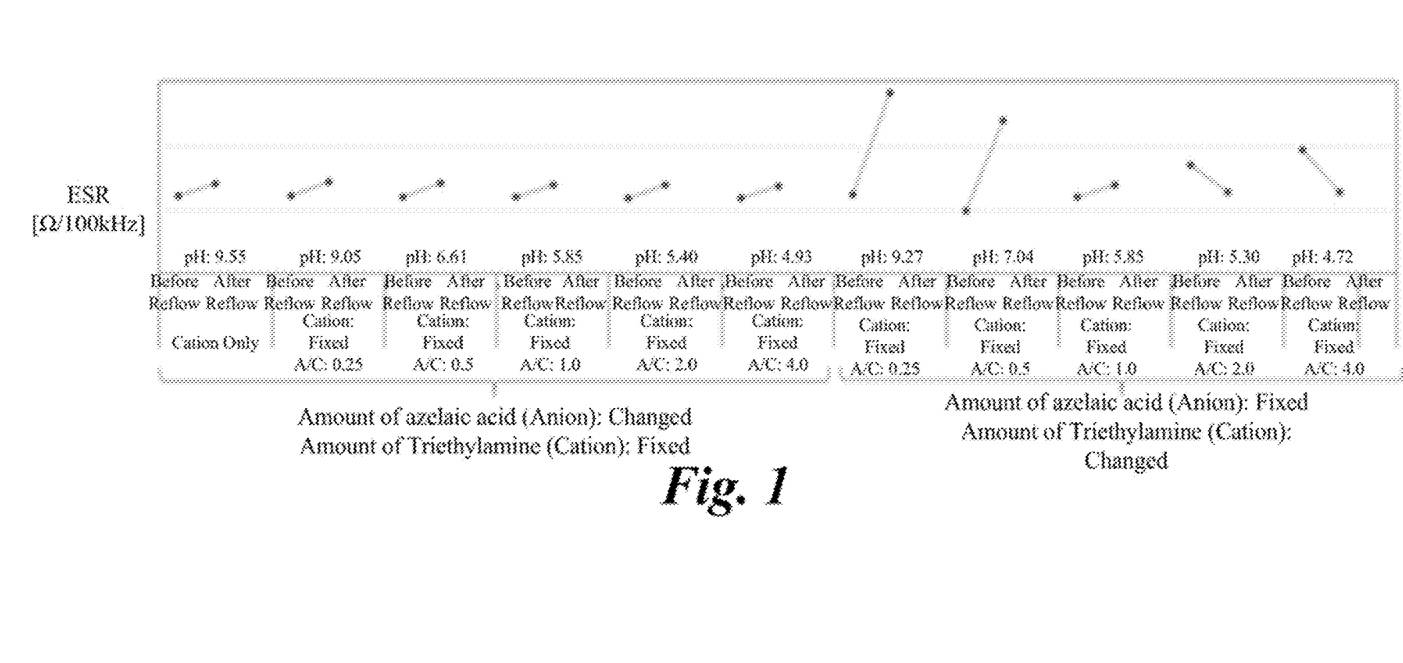
FIG. 1 is a graph illustrating a relationship between a ratio of an anion (acid) component and a cation (base) component included in liquid, and a change in ESR before and after a reflow.

The inventors produced the solid electrolytic capacitors in which an amount of cation components is fixed and an amount of anion component is changed, and the solid electrolytic capacitors in which an amount of cation components is changed and an amount of anion component is fixed, performed a reflow process to load heat stress to theses the solid electrolytic capacitors, and measured ESR before and after the loading of heat stress. Note that the leftmost result in FIG. 1 (described as "cation only" in FIG. 1) is an example in which azelaic acid that is the anion component is not added and only triethylamine that is the cation component is added. As a result, as illustrated in FIG. 1, it was found that changes in ESR of each of the solid electrolytic capacitors in which the amount of cations is fixed before and after the loading of heat stress had similar tendency, and there were large changes and small changes in ESR of each of the solid electrolytic capacitors in which the amount of anions is fixed before and after the loading of heat stress. The inventors found from this result that the changes in ESR produced before and after the loading of heat stress were determined by the amount of cation components included in the electrolyte layers rather than the effect of pH and the ratio of acid and base.

Accordingly, a solid electrolytic capacitor of the present disclosure is based on this discovery, and includes:

a capacitor element formed by opposing an anode foil and a cathode foil; and an electrolyte layer formed in the capacitor element, in which:

the electrolyte layer includes:

a solid electrolyte layer including a dopant and a conjugated polymer; and a liquid filled in air gaps in the capacitor element on which the solid electrolyte layer is formed, and the solid electrolyte layer includes ammonia as cation component, and a molecular ratio of the cation component relative to 1 mol of a functional group which can contribute to a doping reaction of the dopant, in the electrolyte layer is 23 or less.

The cation component may be included only in the liquid, and the molecular ratio of the cation component relative to 1 mol of the functional group may be 23 or less.

The cation component may be included only in the solid electrolyte layer, and the molecular ratio of the cation component relative to 1 mol of the functional group may be 23 or less.

The cation component may be included in both the electrolyte layer and the liquid, and the molecular ratio of a total of the cation component in the electrolyte layer and the liquid relative to 1 mol of the functional group may be 23 or less.

The molecular ratio of the cation component relative to 1 mol of the functional group in the electrolyte layer may be 11.4 or less, and the cation component may be included in the electrolyte layer.

The molecular ratio of the cation component relative to 1 mol of the functional group in the electrolyte layer may be 6 or less, and the cation component may be included in the electrolyte layer.

The ammonia may be included in the electrolyte layer in a molar fraction of 0.1 or more of all the cation component in the electrolyte layer.

The ammonia may be included in the electrolyte layer in a molar fraction of 0.5 or more of all the cation component in the electrolyte layer.

The dopant may be polystyrene sulfonic acid.

The liquid may include ethylene glycol.

50% or more of the liquid may be ethylene glycol.

Effect of Invention

According to the present disclosure, the solid electrolytic capacitor using the combination of the solid electrolyte and the liquid can suppress the dedoping reaction of the conjugated polymer and can achieve the excellent ESR, and since the heat stability is high, the increase in ESR after the loading of heat stress can be suppressed.

DESCRIPTION OF PREFERRED EMBODIMENT

In below, a solid electrolytic capacitor according to embodiments of the present disclosure is described. Note that the solid electrolytic capacitor is, for example, in a wound-type or stacked-type shapes. Although in the present embodiments, the wound-type is described as an example, the solid electrolytic capacitor according to the present disclosure is not limited thereto, and embodiments describing others are also not limited thereto.

A solid electrolytic capacitor is a passive element that performs charging and discharging of electrical charge by capacitance, and is a so-called hybrid-type solid electrolytic capacitor using a combination of a solid electrolyte and a liquid. Hereinafter, the hybrid-type solid electrolytic capacitor is just referred to as the solid electrolytic capacitor.

A wound-type solid electrolytic capacitor is formed by inserting a cylindrical capacitor element into an outer case with bottom, fitting a sealing rubber to an opening of the outer case, and sealing the opening by fastening process. An electrolyte layer is formed on the capacitor element, an anode foil and a cathode foil are respectively connected to an anode lead and a cathode lead, and the anode lead and the cathode lead are drawn out from the sealing rubber.

In such solid electrolytic capacitors, the capacitor element is formed by winding the anode foil and the cathode foil via a separator. A dielectric oxide film layer is formed on a surface of the anode foil. The electrolyte layer includes a solid electrolyte layer and the liquid. The solid electrolyte layer is formed so as to cover at least a part of the dielectric oxide film layer on the surface of the anode foil. The liquid is filled in air gaps of the capacitor element on which the solid electrolyte layer is formed.

(Electrode Foil)

The anode foil and the cathode foil are a long-length foil body formed of a valve action metal. The valve action metal is, for example, aluminum, tantalum, niobium, niobium oxide, titanium, hafnium, zirconium, zinc, tungsten, bismuth, and antimony. A purity of the anode foil is preferably 99.9% or more and a purity of the cathode foil is preferably 99% or more, however, impurities such as silicon, iron, copper, magnesium, and zinc, etc., may be included.

These anode foil and cathode foil are a sintered body which was produced by sintering powders of the valve action metal or a etched foil produced by performing an etching process to an extended foil, and surfaces thereof has a porous structure. The porous structure is formed of tunnel-shape pits, spongy pits, or air gaps between dense powders. Typically, the porous structure is formed by DC etching or AC etching which apply direct current or alternating current in an acidic aqueous solution in which halogen ions such as hydrochloric acid is present, or by vapor depositing or sintering metal particles, etc., to a core. Etching process may be performed to the cathode foil.

The dielectric oxide film layer is a dielectric layer of the solid electrolyte capacitor, and typically is an oxide film formed on a surface layer of the anode foil. If the anode foil is aluminum, the dielectric oxide film layer is an aluminum oxide layer which is an oxidized porous structure region. This dielectric oxide film layer is formed by applying voltage in a solution in which halogen ions are not present, such as aqueous solution of adipic acid and boric acid, etc. A thin dielectric oxide film layer may be formed also on the cathode foil if necessary, and furthermore, layers consisting of metal nitrides, metal carbides, and metal carbonitrides formed by thin film deposition method, or layers which includes carbon on the surface may be used. Dimensions of the anode foil and the cathode foil may be set arbitrary in accordance with specification of the solid electrolytic capacitor to be produced.

(Solid Electrolyte Layer)

The solid electrolyte layer includes a conjugated polymer and a dopant. The conjugated polymer or a doped conjugated polymer are also referred to as a conductive polymer. The conjugated polymer can be obtained by chemical oxidative polymerization or electrolytic oxidative polymerization of monomers having n conjugated double bonds or derivatives thereof. By performing doping reaction to the conjugated polymer, the conductive polymer expresses excellent conductivity.

As the conjugated polymer, known polymers may be used without any limitation. For example, polypyrrole, polythiophene, polyfuran, polyaniline, polyacetylene, polyphenylene, polyphenylenevinylene, polyacene, and polythiophenevinylene, etc., may be cited. These conjugated polymers may be used in single or in combination of two or more, and further may be copolymer of two or more types of monomers.

Among above conjugated polymers, the conjugated polymer formed by polymerization of thiophene or derivatives thereof is preferable, and the conjugated polymer formed by polymerization of 3,4-ethylenedioxythiophene (i.e. 2,3-dihydrothieno[3,4-b][1,4]dioxine). 3-alkylthiophene, 3-alkoxythiophene, 2-alkyl-4-alkoxythiophene, 3,4-alkylthiophene, and 3,4-alkoxythiophene, or derivatives thereof are preferable. As thiophene derivatives, compounds selected from thiophenes having substituents at third and fourth positions are preferable, and the substituents at the third and fourth positions in the thiophene ring may form a ring together with the carbons at the third and fourth positions. Number of carbons in alkyl groups and alkoxy groups is suitably 1 to 16, and in particular, the polymer of 3,4-ethylenedioxythiophene which is called EDOT, that is, poly(3,4-ethylenedioxythiophene) which is called PEDOT is particularly preferable. In addition, alkylated 3,4-ethylenedioxythiophene, which is 3,4-ethylenedioxythiophene to which alkyl group is added, may be used, and for example, methylated ethylenedioxythiophene (i.e. 2-methyl-2,3-dihydro-thieno[3,4-b][1.4]dioxine), ethylated ethylenedioxythiophene (i.e. 2-ethyl-2,3-dihydro-thieno[3,4-b][1.4]dioxine) may be cited.

As the dopant, known dopants may be used without any limitation. For example, inorganic acids such as boric acid, nitric acid, and phosphoric acid, and organic acids such as acetic acid, oxalic acid, citric acid, ascot acid, tartaric acid, squaric acid, rhodizonic acid, croconic acid, salicylic acid, p-toluenesulfonic acid, 1,2-dihydroxy-3,5-benzenesulfonic acid, methanesulfonic acid, trifluoromethanesulfonic acid, borodisalicylic acid, bisoxalateborate acid, sulfonylimide acid, dodecylbenzenesulfonic acid, propylnaphthalenesulfonic acid, and butylnaphthalenesulfonic acid may be cited. In addition, as polyanions, polyvinylsulfonic acid, polystyrenesulfonic acid, polyarylsulfonic acid, polyacrylsulfonic acid, polymethacrylsilfonic acid, poly(2-acrylamide-2-methylpropanesulfonic acid), polyisoprenesulfonic acid, polyacrylic acid, polymethacrylic acid, and polymaleic acid may be cited. The dopant may be used in single or in combination of two or more. In addition, polymer or monomer may be used.

Note that a number average molecular weight of the polyanion is preferably 1,000 to 2,000,000, and more preferably 10,000 to 500,000. It is not preferable for the number average molecular weight to be less than 1,000 because the conductivity of the conductive polymer to be obtained would be insufficient and the dispersibility thereof would decrease, and it is not preferable for the number average molecular weight to be more than 2,000,000 because the viscosity thereof increases.

For the solid electrolyte layer, for example, the mixture solution can be obtained by adding the monomer, the acid or the alkaline metal salt thereof which release the dopant, and an oxidant, stirring them until chemical oxidative polymerization is completed, and then removing the oxidant and the residual monomer by purification such as ultrafiltration, cation exchange, and anion exchange. As the oxidant, trivalent iron salt such as iron(III) p-toluenesulfonate, iron(III) naphthalenesulfonate, and iron(III) anthraquinonesulfonate, or peroxodisulfate such as peroxodisulfuric acid, ammonium peroxodisulfate, and sodium peroxodisulfate may be used, and the oxidant may be used in single or in combination of two or more. Although not strictly limited, the polymerization temperature is generally 10 to 60° C. The polymerization time is generally 10 minutes to 30 hours.

Furthermore, for the solid electrolyte layer, for example, the mixture solution can be obtained by adding the monomer and the acid or the alkaline metal salt thereof which release the dopant, performing electrolytic oxidative polymerization to them along with stirring, and then removing the residual monomer by purification such as ultrafiltration, cation exchange, and anion exchange. The electrolytic oxidative polymerization is performed by one of constant potential scheme, constant current scheme, and potential sweeping scheme. The potential of 1.0 to 1.5 V to a saturated calomel electrode is preferable in the case of the constant potential scheme, the current value of 1 to 10000 $\mu A/cm^2$ is preferable in the case of constant current scheme, and the sweeping rate of 5 to 200 mV/s in the range of 0 to 1.5 V to the saturated calomel electrode is preferable in the case of potential sweeping scheme. Although not strictly limited, the polymerization temperature is generally 10 to 60° C. The polymerization time is generally 10 minutes to 30 hours.

The formation method of the solid electrolyte layer is not particularly limited, and for example, the solid electrolyte layer may be formed by impregnating the capacitor element with a dispersion including particles or powder of the conductive polymer, and applying the conductive polymer to the dielectric oxide film layer. To facilitate the impregnation to the capacitor element, depressurizing and pressurizing may be performed, as necessary. The impregnation may be repeated for a plurality of times. A solvent of the dispersion of the conductive polymer is removed by transpiration by drying, as necessary. Heat drying and vacuum drying may be performed, as necessary.

The solvent of dispersion of the conductive polymer may be a solvent in which the particles or powder of the conductive polymer would disperse, and for example, water and organic solvent and the mixtures thereof may be used. As the organic solvent, polar solvents such as N-methyl-2-pyrrolidone, N,N-dimethylformamide, N,N-dimethylacetamide, and dimethyl sulfoxide, alcohols such as methanol, ethanol, propanol, and butanol, esters such as ethyl acetate, propyl acetate, and butyl acetate, hydrocarbons such as hexane, heptane, benzene, toluene, and xylene, carbonate compounds such as ethylene carbonate and propylene carbonate, ether compounds such as dioxane and diethyl ether, chain ethers such as ethylene glycol dialkyl ether, propylene glycol dialkyl ether, polyethylene glycol dialkyl ether, and polypropylene glycol dialkyl ether, heterocyclic compounds such as 3-methyl-2-oxazolidinone, and nitrile compounds such as acetonitrile, glutaronitrile, methoxyacetonitrile, propionitrile, and benzonitrile may be preferably exemplified.

The cation components may be added to the dispersion including the conductive polymer consisting of the conjugated polymer and the dopant. The cation component that is added to the dispersion including the conductive polymer are not particularly limited, and for example, inorganic alkalis such as sodium hydroxide, potassium hydroxide, calcium hydroxide, and ammonia, aliphatic amines such as ethylamine, diethylamine, methylethylamine, and triethylamine, aromatic amines such as aniline, benzylamine, pyrrole, imidazole, pyridine, and derivatives thereof, nitrogen-containing compounds such as N-methyl-pyrrolidone, N,N-dimethylformamide, N,N-dimethylacetamide, hexamethylphosphortriamide, N-methylpyrrolidone, N-methylformamide, and N-vinylacetamide, sodium alkoxides such as sodium methoxide and sodium ethoxide, metal alkoxides such as potassium alkoxide and calcium alkoxide, and organic alkalis such as dimethyl sulfoxide may be cited. These cation components may be used in single or in combination of two or more.

Furthermore, polyhydric alcohol may be included in the conductive polymer of the dispersion. As the polyhydric alcohols, sorbitol, ethylene glycol, diethylene glycol, triethylene glycol, polyoxyethylene glycol, glycerin, polyoxyethylene glycerin, xylitol, erythritol, mannitol, dipentaerythritol, or combinations of these two or more may be cited. Since the boiling point of the polyhydric alcohols are high, the polyhydric alcohols can remain in the solid electrolyte layer even after the drying process, and the ESR reduction effect and withstand voltage improvement effect can be obtained. Moreover, other compounds may be included. For example, common additives such as organic binders, surfactants, defoamers, coupling agents, antioxidants, and UV absorbers, etc., may be added. ESR may be significantly decreased by adding additives to the dispersion of the conductive polymer or by increasing the number of times of impregnating the capacitor element with the dispersion of the conductive polymer.

(Liquid)

The liquid is filled in the air gaps of the capacitor element on which the solid electrolyte layer is formed. The liquid may be impregnated to the level which the solid electrolyte layer swells. In the impregnation process of the liquid, depressurizing and pressurizing may be performed, as necessary. The liquid is one types or combination of two or more types among types of solvents described and listed below. This liquid is used as the solvent, and may include solutes and additives described below. The liquid including the below-described solute is called the electrolytic solution.

Firstly, as the solvent, protic organic polar solvent or aprotic organic polar solvent may be cited, and may be used in single or in combination of two or more. Furthermore, as the solute, the anion component and the cation component are included. Typically, the solute is a salt of organic acid, a salt of inorganic acid salt, and a salt of the composite compound of the organic acid and the inorganic acid, and may be used in single or in combination of two or more. The acid that would be the anion and the base that would be the cation may be added separately.

As the protic organic polar solvent that is the solvent, monohydric alcohols, polyhydric alcohols, and oxyalcohol compounds, etc., may be cited. As the monohydric alcohols, ethanol, propanol, butanol, pentanol, hexanol, cyclobutanol, cyclopentanol, cyclohexanol, and benzyl alcohol may be cited. As the polyhydric alcohols and the oxyalcohol compounds, alkylene oxide adducts of polyhydric alcohols such as ethylene glycol, propylene glycol, glycerin, methyl cellosolve, ethyl cellosolve, methoxypropylene glycol, dimethoxy propanol, polyethylene glycol, and polyoxyethylene glycerin may be cited. Among them, ethylene glycol is preferable for the solvent. By ethylene glycol, higher-order structure of the conductive polymer is changed, and the initial ESR and further the high temperature characteristic would be excellent. Ethylene glycol may be 50% or more of the liquid.

AS the aprotic organic polar solvent, sulfones, amides, lactones, cyclic amides, nitriles, and oxides may be representatively cited. As the sulfones, dimethylsulfone, ethylmethylsulfone, diethylsulfone, sulfolane, 3-methylsulfone, and 2,4-dimethylsulfolane may be cited. As the amides, N-methylformamide, N,N-dimethylformamide, N-ethylformamide, N,N-diethylformamide, N-methylacetamide, N,N-dimethylacetamide, N-ethylacetamide, N,N-diethyl acetamide, and hexamethylphosphoricamide may be cited. As the lactones and the cyclic amides, γ-butyrolactone, γ-valerolactone, δ-valerolavtone, N-methyl-2-pyrrolidone, ethylene carbonate, propylene carbonate, butylene carbonate, and isobutylene carbonate may be cited. As the nitriles, acetonitrile, 3-methoxypropionitrile, and glutaronitrile may be cited. As the oxides, dimethyl sulfoxide may be cited.

As the organic acid that would be the anion components as the solute, carboxylic acids such as oxalic acid, succinic acid, glutaric acid, pimelic acid, suberic acid, sebacic acid, phthalic acid, isophthalic acid, terephthalic acid, maleic acid, adipic acid, benzoic acid, toluic acid, enanthic acid, malonic acid, 1,6-decanedicarboxylic acid, 1,7-octanedicarboxylic acid, azelaic acid, resorcinic acid, phloroglucinic acid, gallic acid, gentisic acid, protocatechuic acid, pyrocatechuic acid, trimellitic acid, and pyromellitic acid, phenols, and sulfonic acids may be cited. In addition, as the inorganic acids, boric acid, phosphoric acid, phosphorus acid, hypo phosphorus acid, carbonic acid, and silicic acid may be cited. As the composite compound of organic acid and inorganic acid, borodisalicylic acid, borodioxalic acid, borodimalonic acid, borodisuccinic acid, borodiadipic acid, borodiazelaic acid, borodicarboxylic acid, borodimaleic acid, borodilactic acid, boroditartaric acid, borodicitric acid, borodiphthalic acid, borodi(2-hydroxy)isobutyric acid, borodiresorcinic acid, borodimethylsalicylic acid, borodinaphthoic acid, borodimandelic acid, and borodi(3-hydroxy) propionic acid may be cited.

Furthermore, as the at least one salt of organic acid, inorganic acids, and composite compound of organic acid and inorganic acid, for example, ammonium salt, quaternary ammonium salt, quaternarized aminidium salt, amine salt, sodium salt, and potassium salt may be cited. As quaternary ammonium ions of the quaternary ammonium salt, tetramethylammonium, triethylmethylammonium, and tetraethylammonium may be cited. As the quaternized aminidium salt, ethyldimethylimidazolium and tetramethylimidazolium may be cited. As the amine salts, primary amine, secondary amine, and tertiary amine may be cited. As the primary amines, methylamine, ethylamine, and propylamine may be cited, as the secondary amine, dimethylamine, diethylamine, ethylmethylamine, and dibutylamine may be cited, and as the tertiary amines, trimethylamine, triethylamine, tributylamine, ethyldimethylamine, and ethyldiisopropylamine may be cited.

In addition, other additives may be added to the liquid. As the additives, alkylene oxide adducts of polyhydric alcohols such as polyethylene glycol and polyethylene glycerin, complex compounds of boric acid and polysaccharide (such as mannitol and sorbitol), complex compounds of boric acid and polyhydric alcohol, boric acid esters, nitro compounds (such as o-nitrobenzoic acid, m-nitrobenzoic acid, p-nitrobenzoic acid, o-nitrophenol, m-nitrophenol, p-nitrophenol, and p-nitrobenzylalcohol), and phosphoric acid esters may be cited. These may be used in single or in combination of two or more. Although the amount of additives is not particularly limited, it is preferable to add the additives in the amount that does not give bad effect to the characteristic of the solid electrolytic capacitor, and for example, the amount is 60 wt % or less in the liquid. Among above additives, the alkylene oxide adducts of polyhydric alcohols, particularly polyethylene glycol or the complex compounds of boric acid and polyhydric alcohol may be preferably added to improve the withstand voltage, and the nitro compounds may be preferably added to absorb gas in the capacitor.

There is a case moisture is contaminated to the solid electrolytic capacitor in the production process even when moisture is intentionally not included. It is preferable to keep the moisture rate in the solid electrolytic capacitor to be 10 wt % or less, and it is more preferable to keep the moisture rate in the solid electrolytic capacitor to be 5 wt % or less. If the moisture rate is high, adhesion of the electrode foil and the solid electrolyte layer gets worse such that the solid electrolyte layer is deteriorated, and therefore, there is a consideration that ESR increases. Note that as the reason for the moisture to be contaminated in the solid electrolytic capacitor in the production process, a case in which the moisture is attached to the separators and a case in which moisture contained in the atmosphere is contaminated can be cited.

(Ratio of Electrolyte Layer Component)

Firstly, below-described molecular ratio of the cation relative to 1 mol of a functional group which can contribute to the doping reaction of the dopant is a molecular ratio of the cations relative to 1 mol of the functional group which can contribute to the doping reaction among the functional groups of the dopant. All of the functional group which can contribute to the doping reaction of the dopant does not have to be involved in the doping reaction of the conjugated polymer, and for example, a part of the functional group which can contribute to the doping reaction may be doped, and the remaining portion may not be doped. Furthermore, all of the functional group which can contribute to the doping reaction of the dopant may be doped. That is, among the functional groups of the dopant, the molecular ratio of the cation component relative to 1 mol of the functional group which can contribute to the doping reaction is important rather than the functional group involved in the doping reaction. In below, the functional group which can contribute to the doping reaction of the dopant is referred to as a doping-capable functional group. Also, the cation components are simply called the cations.

At least ammonia is added to the electrolyte layer as the cation component. In addition, the molecular ratio of all of the cations in the electrolyte layer including ammonia relative to 1 mol of the functional group is 23 or less. By this range, ESR of the solid electrolytic capacitor can be suppressed low even after a loading of heat stress. The loading of heat stress indicates all situations in which the heat stress is loaded to the solid electrolytic capacitor, such as at the time of a reflow process and the usage of the solid electrolytic capacitor under high temperature environment.

Although not limited, the reason why ESR can be suppressed low when the molecular ratio of all of the cations in the electrolyte layer including ammonia relative to 1 mol of the functional group is 23 or less is assumed as follows. That is, the cation components neutralize the dopant and transfers the conductive polymer from bipolaron to polaron, such that the conductivity of the conductive polymer is improved and ESR of the solid electrolyte capacitor is decreased. Furthermore, The heat stress produces a first phenomenon of transferring the conductive polymer from bipolaron to polaron by facilitating the neutralization action of the dopant by the cation components, and a second phenomenon of facilitating the dedoping reaction of the dopant by facilitating the action of the cation components to the dopant. Then, it is assumed that a balance of the first phenomenon and the second phenomenon is related to the molecular ratio of cations relative to 1 mol of the doping-capable functional group.

As a result, it is assumed that, if the molecular ratio of cations relative to 1 mol of the doping-capable functional group is more than 11.4 and 23 or less, the second phenomenon by the loading of heat stress is relatively suppressed so that the effect of the first phenomenon by the loading of heat stress remains, and the conductive polymer is transferred from bipolaron to polaron. In contrast, if said molecular ratio is more than 23, the second phenomenon becomes largely superior, and as a result, ESR after the loading of heat stress becomes large.

In particular, in the electrolyte layer, the molecular ratio of cations relative to 1 mol of the doping-capable functional group is preferably 11.4 or less. If said molecular ratio is more than 6 and 11.4 or less, the effect of the first phenomenon by the loading of heat stress becomes large, and the increase in ESR of the solid electrolytic capacitor after the loading of heat stress is suppressed lower in the range of more than 11.4 and 23 or less, and as a result, ESR of the solid electrolytic capacitor after the loading of heat stress is further suppressed lower. Furthermore, the molecular ratio of cations relative to 1 mol of the doping-capable functional group is preferably more than 2.8 and 6 or less. If said molecular ratio is more than 2.8 and 6 or less, the first phenomenon and the second phenomenon by the loading of heat stress competes so that ESR of the solid electrolytic capacitor does not change between before and after the loading of heat stress, and as a result, ESR of the solid electrolytic capacitor after the loading of heat stress can be further suppressed lower.

Furthermore, if ethylene glycol is included in the solvent of the liquid, the molecular ratio of cations relative to 1 mol of the doping-capable functional group is preferably 2.8 or less. If said molecular ratio is 2.8 or less, the first phenomenon by the loading of heat stress would act superior than the second phenomenon, and ESR after the loading of heat stress is suppressed equally or lower relative to ESR before the loading of heat stress.

Note that if at least ammonia is added as the cation component, the molecular ratio at which the first phenomenon and the second phenomenon by the loading of heat stress compete, the molecular ratio at which the effect of the first phenomenon by the loading of heat stress largely remains, and the molecular ratio at which the second phenomenon by the loading of heat stress act superior each tend to shift in the direction to become larger, when compared with the case in which the cation components other than ammonia are added. It is assumed that, it is difficult for the dedoping reaction to occur because the salt-forming capability of ammonia with the polystyrene sulfonic acid that is the dopant is low.

Here, the cation component included in the electrolyte layer is a total amount of cation component included in the electrolyte layer regardless of whether it is from the liquid or the solid electrolyte layer, and ammonia is included in one of the liquid, the solid electrolyte layer, or both. In detail, if the cation component is included in the electrolyte layer and is not included in the liquid, the cation component included in the electrolyte layer is the cation component from the solid electrolyte layer, and the total amount of cation component from the solid electrolyte layer is defined relative to 1 mol of the doping-capable functional group. Furthermore, if the cation component is not included in the electrolyte layer and is included in the liquid, the cation component included in the liquid is the cation component from the liquid, and the total amount of cation component from the liquid is defined relative to 1 mol of the doping-capable functional group. In addition, if the cation component is included in both the electrolyte layer and the liquid, the total amount of the cation component from the solid electrolyte layer and the cation component from the liquid is defined as the cation component included in the electrolyte layer relative to 1 mol of the doping-capable functional group which can contribute to the doping reaction of the dopant.

Ammonia is included in one of the liquids, the solid electrolyte layer, or both. Furthermore, the molecular fraction of ammonia in all the cation component included in the liquid and the solid electrolyte layer is preferably 0.1 or more, and the molecular fraction of ammonia in all the cation component included in the liquid and the solid electrolyte layer is more preferably 0.5 or more. The molecular fraction of ammonia in all the cation component included in the liquid and the solid electrolyte layer is further preferably 0.9 or more, and the molecular fraction of ammonia is particularly preferably 1.0, that is, it is particularly preferable that only ammonia is included. ESR after the loading of heat stress largely changes before and after the boundaries between each molecular fraction of ammonia of 0.1, 0.5, and 0.9, and furthermore, ESR after the loading of heat stress becomes the best when the molecular fraction of ammonia is 1.0.

The doping-capable functional group are not particularly limited, and organic acid, sulfo group, carboxy group, and hydroxy group, etc., may be cited. Here, by adding small amount of acceptors which easily receives electrons or donors which easily donates electrons, to the conjugated polymers, the conductivity is expressed. When the acceptors or the donors are added to the conjugated polymers, $\pi$ electrons are extracted from the conjugates polymers to form negative charge carriers (electron holes or holes) in the case the acceptors are added, and electrons are supplied to form the negative charge carriers in the case the donors are added, expressing the conductivity.

Note that, in the electrolyte layer, the anion components and the cation components may be included in equal amount, or the anion components may be included excessively compared to the cation components, or the cation components may be included excessively compared to the anion components. That is, the molecular ratio of the acid component and the base component in the electrolyte layer may be arbitrary. As long as the cation components included in the electrolyte layer are defined relative to 1 mol of the doping-capable functional group, ESR of the solid electrolytic capacitor after the loading of head stress can be suppressed low even if the amount of the anion components and the cation components is equivalent, or it is anion components excessive or cation component excessive.

(Separator)

Separators may be celluloses such as kraft, manila hemp, esparto, hemp, rayon, and combinations thereof, polyester resins such as polyethylene terephthalate, polybutylene terephthalate, polyethylene naphthalate, and derivatives thereof, polytetrafluoroethylene resins, polyvinylidene fluoride resins, vinylon resins, polyamide resins such as aliphatic polyamide, semi-aromatic polyamide, and fully aromatic polyamide, polyimide resins, polyethylene resins, polypropylene resins, trimethylpentane resins, polyphenylene sulfide resins, acryl resins, and polyvinyl alcohol resins, and these resins may be used in single or in combination.

EXAMPLES

In below, the present disclosure is further described in detail based on examples. Note that the present disclosure is not limited to the following examples.

Solid electrolytic capacitors of examples 1 to and comparative example 1 were produced by changing amounts of the cation components and the anion components in the electrolyte layer, and the loading of heat stress by the reflow process was given to the examples, and the ESR before and after the loading of heat stress was measured. Common points among each solid electrolytic capacitor were as follows.

That is, the anode foil was an aluminum foil, the surface thereof was enlarged by the etching process, and the dielectric oxide film was formed thereon by the chemical treatment. The cathode foil was a plane foil that is an aluminum foil to which the etching process had not been performed. The lead wires were connected to the anode foil and the cathode foil, respectively, and the anode foil and the cathode foil were set to face each other and were wound via the manila separator. In this way, the capacitor element with diameter of 6.1 mm×height of 6.3 mm was formed. This capacitor element was immersed in the ammonium dihydrogen ammonium solution for 10 minutes to perform restoration chemical treatment.

Next, polyethylene dioxythiophene (PEDOT) (PEDOT/PSS) to which polystyrene sulfonic acid (PSS) had been doped was prepared, and ammonia was added as the cation component according to each of the examples and the comparative examples. The capacitor element was immersed in this dispersion, and was drawn out and dried for 30 minutes at 150° C. The immersion and drying were repeated twice. In this way, the solid electrolyte layer was forms on the capacitor element. After the solid electrolytic capacitor was produced, the amount of PEDOT/PSS in the solid electrolytic capacitor was measured, and was about 0.6 mg.

Furthermore, azelaic acid that would be the anion components and ammonia that would be the cation components according to each of the examples and the comparative examples were added to ethylene glycol to produce the liquid. Then, the capacitor element on which the solid electrolyte layer had been formed was immersed in the liquid. This capacitor element was inserted into an outer case with bottom, a sealing rubber was fit to an opening of the outer case, and the outer case was sealed by fastening process.

Aging process was performed to each solid electrolytic capacitor by applying voltage. Rated capacity of produced solid electrolytic capacitors were 47 μF. ESR of these solid electrolytic capacitors before the loading of heat stress was measure at 20° C. which is room temperature. Then, the reflow process at peak temperature of 260° C. was performed to examples 1 to 21 and comparative example 1 to check the effect by the loading of heat stress, and after being left at room temperature, ESR after the loading of heat stress by the reflow process was measured.

Here, PSS used as the dopant was the same for all solid electrolytic capacitors. As shown in below Table 1, produced solid electrolytic capacitors had different amount of ammonia included in the solid electrolyte layer, different amount of the azelaic acid included in the electrolytic solution (the liquid), and different amount of ammonia included in the electrolytic solution (the liquid). Therefore, as shown in the below Table 1, the molecular ratio of the cation component relative to 1 mol of the doping-capable functional group were different. The component ratios are shown in the below Table 1 together with ESR of each of the solid electrolytic capacitors before and after the reflow process. In Table 1, "liquid" indicates "electrolytic solution".

was fixed, and the amount of anion components in the liquid was changed from non-present to excessive, relative to the amount of ammonia. In examples 11 to 17, the amount of ammonia that is the cation component in the solid electrolyte layer was fixed, the amount of anion components in the liquid was fixed, and the amount of ammonia that is the cation components in the liquid was changed from non-present to equivalent and then to excessive, relative to the amount of anion components. In examples 18 to 21, the amount of ammonia that is the cation components in the solid electrolyte layer was changed, and the anion components and the cation components were not added to the liquid.

Figure 2:
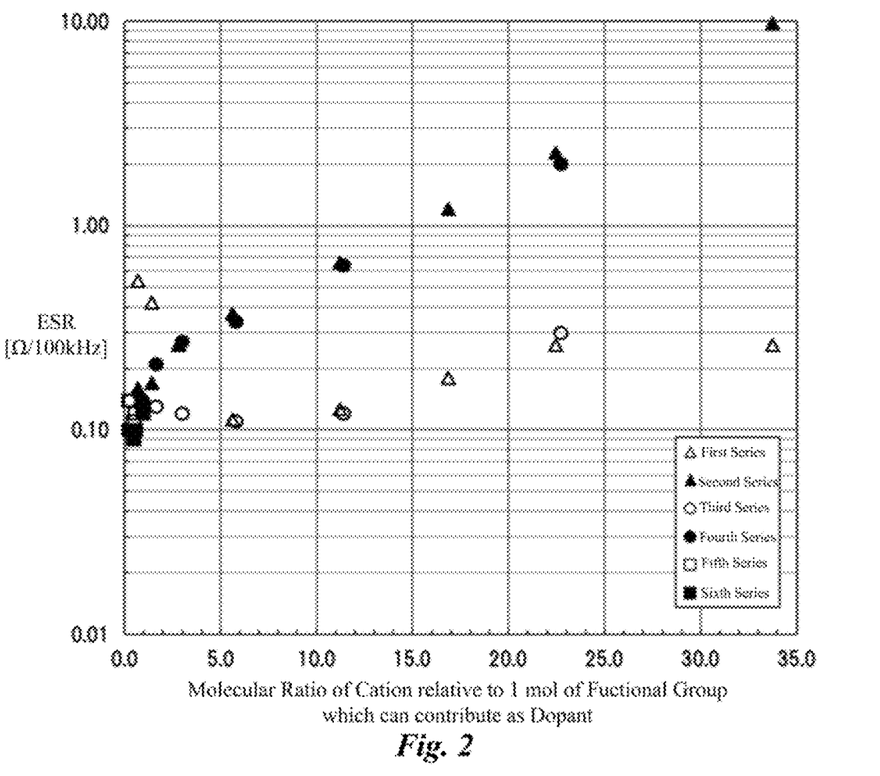
FIG. 2 is a graph illustrating a relationship between ESR before and after the reflow, and a molecular ratio of ammonia relative to 1 mol of a functional group which can contribute to a doping reaction of a dopant.

Furthermore, FIG. 2 is a graph illustrating a relationship between ESR before and after the reflow in Table 1, and a molecular ratio of ammonia that is the cation component relative to 1 mol of a functional group. In FIG. 2, a first series shows the change in ESR before the reflow and is a series that includes examples 1 to 7 and comparative example 1, in which the anion components in the liquid was fixed. A second series is shows change in ESR after the reflow of the first series, and is a series that includes examples 1 to 7 and comparative example 1, in which the anion components in the liquid was fixed. A third series shows the change in ESR before the reflow and is a series that includes examples 11 to 17, in which the amount of ammonia that is the cation components in the solid electro-

TABLE 1

| | Cations added to Solid Electrolyte layer | Composition of Electrolytic Solution | | Cations added to Electrolytic Solution | Total Amount in Electrolyte Layer | ESR [Ω/100 kHz] | |
|---|---|---|---|---|---|---|---|
| | Molecular Ratio of Cation Component relative to 1 mol of Doping-Capable Functional Group | Amount of Anion Component relative to 100 g of Electrolytic Solution [mmol] | Amount of Cation Component relative to 100 g of Electrolytic Solution [mmol] | Molecular Ratio oF Cation Component relative to 1 mol of Doping-Capable Functional Group | Molecular Ratio oF Cation Component relative to 1 mol of Doping-Capable Functional Gtoup | Before Loading of Heat Stress | After Loading of Heat Stress |
| Example 1 | 0 | 17 | 4 | 0.7 | 0.7 | 0.54 | 0.16 |
| Example 2 | 0 | 17 | 8 | 1.4 | 1.4 | 0.42 | 0.17 |
| Example 3 | 0 | 17 | 17 | 2.8 | 2.8 | 0.26 | 0.26 |
| Example 4 | 0 | 17 | 33 | 5.6 | 5.6 | 0.11 | 0.37 |
| Example 5 | 0 | 17 | 66 | 11.2 | 11.2 | 0.13 | 0.66 |
| Example 6 | 0 | 17 | 100 | 16.9 | 16.9 | 0.18 | 1.21 |
| Example 7 | 0 | 17 | 133 | 22.5 | 22.5 | 0.26 | 2.29 |
| Comparative Example 1 | 0 | 17 | 199 | 33.7 | 33.7 | 0.26 | 9.80 |
| Example 8 | 0 | 0 | 17 | 2.8 | 2.8 | 0.24 | 0.27 |
| Example 9 | 0 | 4 | 17 | 2.8 | 2.8 | 0.25 | 0.27 |
| Example 10 | 0 | 67 | 17 | 2.8 | 2.8 | 0.24 | 0.29 |
| Example 11 | 0.2 | 17 | 0 | 0 | 0.2 | 0.14 | 0.10 |
| Example 12 | 0.2 | 17 | 4 | 0.7 | 0.9 | 0.13 | 0.14 |
| Example 13 | 0.2 | 17 | 8 | 1.4 | 1.6 | 0.13 | 0.21 |
| Example 14 | 0.2 | 17 | 17 | 2.8 | 3.0 | 0.12 | 0.27 |
| Example 15 | 0.2 | 17 | 33 | 5.6 | 5.8 | 0.11 | 0.34 |
| Example 16 | 0.2 | 17 | 66 | 11.2 | 11.4 | 0.12 | 0.64 |
| Example 17 | 0.2 | 17 | 133 | 22.5 | 22.7 | 0.30 | 2.02 |
| Example 18 | 0.2 | 0 | 0 | 0 | 0.2 | 0.14 | 0.10 |
| Example 19 | 0.5 | 0 | 0 | 0 | 0.5 | 0.11 | 0.09 |
| Example 20 | 0.6 | 0 | 0 | 0 | 0.6 | 0.12 | 0.10 |
| Example 21 | 1.0 | 0 | 0 | 0 | 1.0 | 0.13 | 0.12 |

As shown in Table 1, as for examples 1 to 7 and comparative example 1, the cation component was not added to the solid electrolyte layer, the amount of azelaic acid that is the anion components in the liquid was fixed, and the amount of ammonia that is the cation components in the liquid was changed from few to equivalent and then to excessive, relative to the amount of anion components. In examples 8 to 10, the cation component was not added to the solid electrolyte layer, the amount of ammonia in the liquid lyte layer was fixed. A fourth series shows the change in ESR after the reflow of the third series and is a series that includes examples 11 to 17, in which the amount of ammonia that is the cation components in the solid electrolyte layer was fixed and the amount of anion components in the liquid was fixed. A fifth series shows the change in ESR before the reflow and is a series that includes examples 18 to 21, in which the amount of ammonia that is the cation components in the solid electrolyte layer was changed and the amount of the anion components and the cation components were not added in the liquid. A sixth series shows the change in ESR after the reflow of the fifth series and is a series that includes examples 18 to 21 in which the amount of ammonia that is the cation components in the solid electrolyte layer was changed and the amount of the anion components and the cation components were not added in the liquid.

Figure 3:
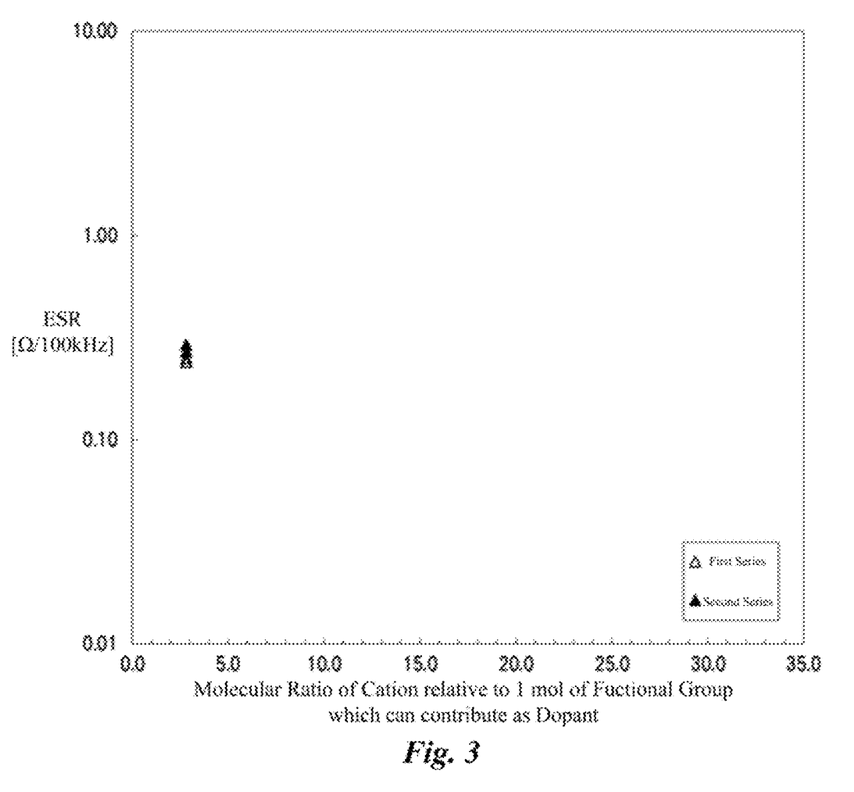
FIG. 3 is a graph illustrating a relationship between ESR before and after the reflow, and a molecular ratio of ammonia relative to 1 mol of a functional group which can contribute to a doping reaction of a dopant.

FIG. 3 is a graph illustrating a relationship between ESR before and after the reflow of Table 1, and the molecular ratio of ammonia that is the cation component relative to 1 mol of the functional group which can contribute to the dopant. In FIG. 3, the first series shows the change in ESR before the reflow and is a series that includes examples 8 to 10, in which ammonia that is the cation components in the electrolyte layer was fixed and the anion components in the liquid was changed. In FIG. 3, the second series shows the change in ESR after the reflow of the first series and is a series that includes examples 8 to 10, in which ammonia that is the cation components in the electrolyte layer was fixed and the anion components in the liquid was changed.

As understood from examples 1 to 7 and comparative example 1 in Table 1, and the second series in FIG. 2, it was found that ESR of the solid electrolytic capacitor after the reflow became high according to the increase in ammonia that is the cation components, and not to the amount of the anion components. As understood from examples 8 to 10 of Table 1, and FIG. 3, it was found that ESR of the solid electrolytic capacitor after the reflow did not change when the amount of ammonia that is the cation components was fixed even when the amount of the anion components was changed.

Furthermore, as understood by comparison between the first series to the fourth series in FIG. 2, in the first series and the second series, and the third series and the fourth series, behaviors of the change in ESR before and after the reflow relative to the change in the amount of the cation components were similar, and it was found that ESR was changed according to the total amount of the ammonia in the electrolyte layer, regardless of whether ammonia was from the solid electrolyte layer or from the liquid.

In addition, as shown in Table 1 and FIGS. 1 and 2, the molecular ratio of ammonia relative to 1 mol of the doping-capable functional group was 2.8 or less, it was found that ESR after the reflow was equivalent or became lower relative to ESR before the reflow. Furthermore, if the molecular ratio of the ammonia relative to 1 mol of the doping-capable functional group was more than 2.8 and 6 or less, ESR of the solid electrolytic capacitor before and after the reflow did not change, and as a result, ESR of the solid electrolytic capacitor after the loading of heat stress could be maintained to be further low. Furthermore, if the molecular ratio of the ammonia relative to 1 mol of the doping-capable functional group was more than 6 and 11.4 or less, increase in ESR of the solid electrolytic capacitor before and after the loading of heat stress was suppressed, and as a result, ESR of the solid electrolytic capacitor after the loading of heat stress could be maintained to be further low. In addition, if the molecular ratio of the ammonia relative to 1 mol of the doping-capable functional group was more than 11.4 and 23 or less, it was found that ESR after the loading of heat stress was suppressed for about 23% when compared to comparative example 1, even though ESR became higher as the cation components increased.

Next, the solid electrolytic capacitors of examples 22 to 27 in which ammonia and other cation components were included in the electrolyte layer were produced, the reflow process was performed to give the loading of heat stress, and ESR before and after the loading of heat stress was measured. In the solid electrolytic capacitors of examples 22 to 27, the cation component included in the solid electrolyte layer was sodium hydroxide and the cation component included in the liquid was ammonia. These solid electrolytic capacitors of examples 22 to 27 were produced by the same condition as examples 1 to 21 except that the cation component included in the solid electrolyte layer was sodium hydroxide.

As shown in below Table 2, in the solid electrolytic capacitors of examples 22 to 27, the amount of sodium hydroxide included in the solid electrolyte layer was fixed and the amount of azelaic acid in the electrolytic solution (liquid) was fixed, however, the amounts of ammonia in the electrolytic solution (liquid) were different. Therefore, as shown in Table 2, in each of the solid electrolytic capacitor, the total molecular ratio of the cation component included in the electrolyte layer relative to 1 mol of the doping-capable functional group were different. The component ratios are shown in the below Table together with ESR of each of the solid electrolytic capacitors before and after the reflow process. In Table 2, "electrolytic solution" indicates "liquid".

TABLE 2

| | Cations added to Solid Electrolyte layer | Composition of Electrolytic Solution | | Cations added to Electrolytic Solution | Total Amount in Electrolyte Layer | | |
| --- | --- | --- | --- | --- | --- | --- | --- |
| | Molecular Ratio of NaOH relative to 1 mol of Doping-Capable Functional Group | Amount of Anion Component relative to 100 g of Electrolytic Solution [mmol] | Amount of Cation Component relative to 100 g of Electrolytic Solution [mmol] | Moleclar Ratio oF Cation Component relative to 1 mol of Doping-Capable Functional Group | Molecular Ratio oF Cation Component relative to 1 mol of Doping-Capable Functional Group | ESR [Ω/100 kHz] | |
| | | | | | | Before Loading of Heat Stress | After Loading of Heat Stress |
| Example 22 | 0.2 | 17 | 4 | 0.7 | 0.9 | 0.14 | 0.13 |
| Example 23 | 0.2 | 17 | 8 | 1.4 | 1.6 | 0.17 | 0.19 |
| Example 24 | 0.2 | 17 | 17 | 2.8 | 3.0 | 0.22 | 0.29 |
| Example 25 | 0.2 | 17 | 33 | 5.6 | 5.8 | 0.10 | 0.41 |
| Example 26 | 0.2 | 17 | 66 | 11.2 | 11.4 | 0.11 | 0.72 |
| Example 27 | 0.2 | 17 | 133 | 22.5 | 22.7 | 0.28 | 3.12 |

As shown in Table 2, in examples 22 to 27, the fixed amount of sodium hydroxide that is the cation component was added to the solid electrolyte layer, the amount of azelaic acid that is the anion component in the liquid was fixed, and the amount of ammonia that is the cation component in the liquid was changed from few to equivalent and then to excessive, relative to the amount of anion components.

Figure 4:
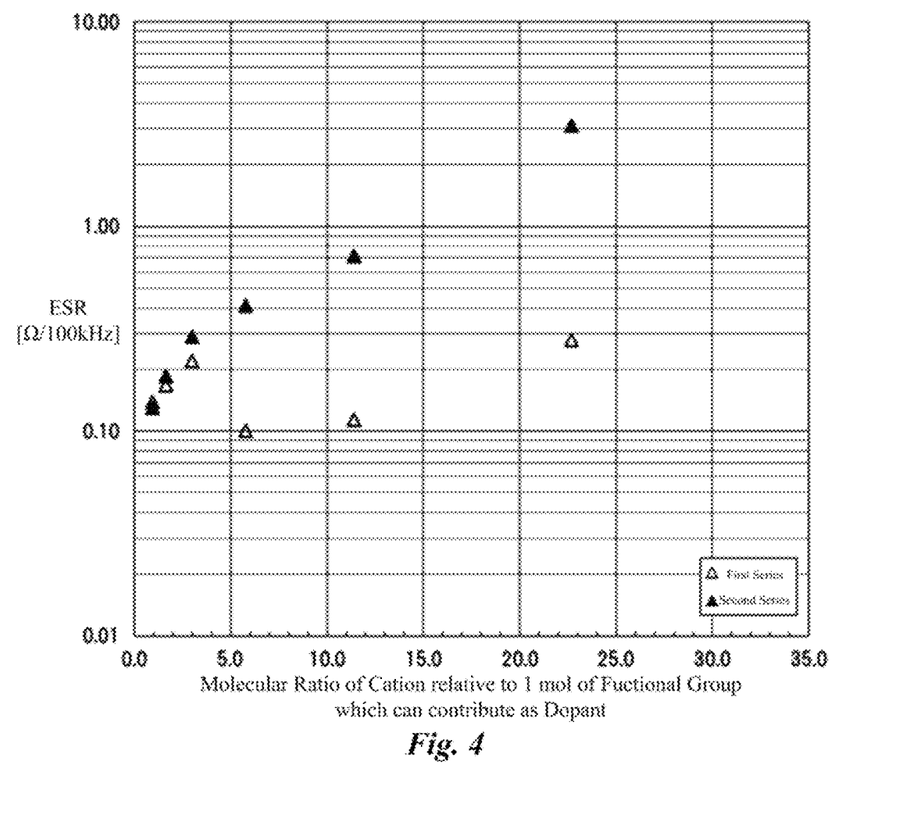
FIG. 4 is a graph illustrating a relationship between ESR before and after the reflow, and a molecular ratio of the cation component, which is the total of ammonia and sodium hydroxide, relative to 1 mol of a functional group which can contribute to a doping reaction of a dopant.

Furthermore, FIG. 4 is a graph illustrating a relationship between ESR before and after the reflow in Table 2, and the first molecular ratio of the cation component which is the total of ammonia and sodium hydroxide relative to 1 mol of the doping-capable functional group. In FIG. 4, the first series shows the change in ESR before the reflow, and the second series shows the change in ESR after the reflow of the first series.

As understood from examples 22 to 27 in Table 2, and the second series in FIG. 4, it was found that ESR of the solid electrolytic capacitor after the reflow got higher according to the increase in the cation components including ammonia, and not to the amount of the anion components, even when other cation components were added as long as ammonia was included as the cation component.

Next, the solid electrolytic capacitors of examples 28 to 39 and comparative examples 7 to 9 in which benzoic acid, 2,6-decane carboxylic acid, or phthalic acid were added as the anion component in the electrolyte were produced, the reflow process was performed to give the loading of heat stress, and ESR before and after the loading of heat stress was measured. The result is shown in Table 3.

nent was changed. The solid electrolytic capacitors of examples 36 to 39 and comparative example 9 were produced by the same condition as examples 1 to 7 except that the anion component included in the liquid was phthalic acid and the amount of ammonia that is the cation component was changed.

Figure 5:
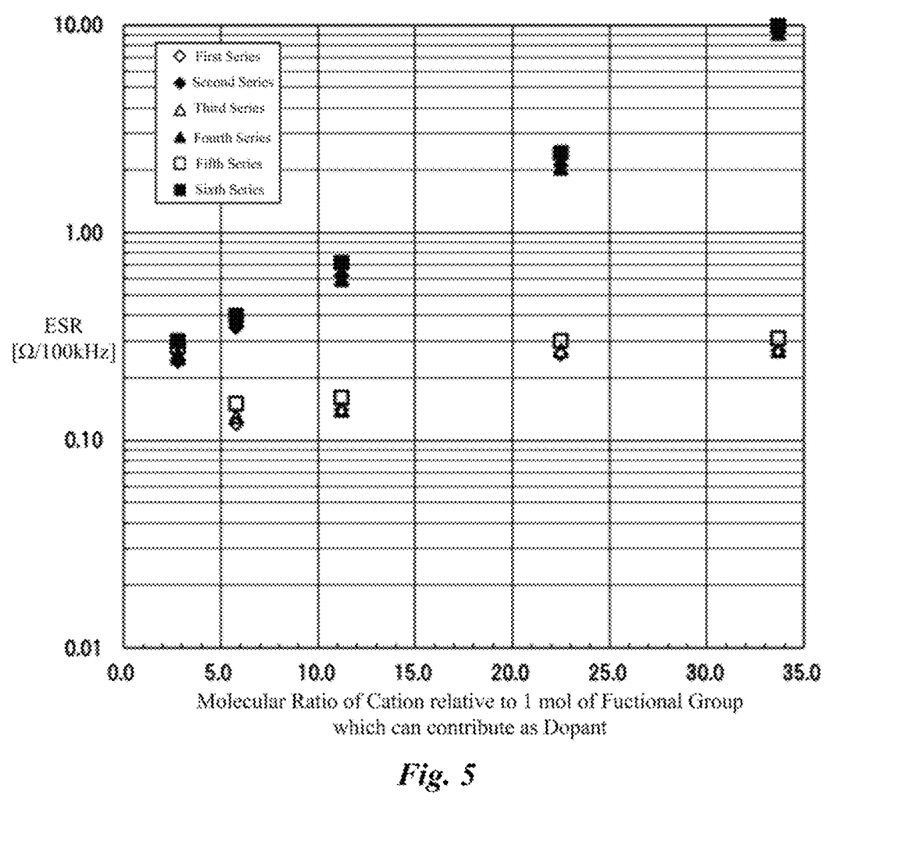
FIG. 5 is a graph illustrating a relationship between ESR before and after the reflow, and a molecular ratio of ammonia relative to 1 mol of a functional group which can contribute to a doping reaction of a dopant.

Furthermore, FIG. 5 is a graph illustrating a relationship between ESR before and after the reflow in Table 3, and a molecular ratio of ammonia that is the cation component relative to 1 mol of a functional group. In FIG. 5, the first series shows the change in ESR before the reflow and is the series that includes examples 28 to 31 and comparative example 7, in which the anion components in the liquid was benzoic acid and the amount of benzoic acid was fixed. The second series shows the change in ESR after the reflow of the first series, and is the series that includes examples 28 to 31 and comparative example 7, in which the anion components in the liquid was benzoic acid and the amount of benzoic acid was fixed. In FIG. 5, the third series shows the change in ESR before the reflow and is the series that includes examples 32 to 35 and comparative example 8, in which the anion components in the liquid was 1,6-decanecarboxylic acid and the amount of 1,6-decane carboxylic acid was fixed. The fourth series shows the change in ESR after the reflow of the third series and is the series that includes examples 32 to 35 and comparative example 8, in which the anion components in the liquid was 1,6-decanecarboxylic acid and the amount of 1,6-decane carboxylic acid was fixed. In FIG. 5, the fifth series shows the change in ESR before the reflow and is the series that includes

TABLE 3

| | Cations added to Solid Electrolyte layer | Composition of Electrolytic Solution | | | Total Amount in Electrolyte Layer | | |
|---|---|---|---|---|---|---|---|
| | Molecular Ratio oF Cation Component relative to 1 mol of Doping-Capable Functional Group | Type of Anion | Amount of Anion Component relative to 100 g of Electrolytic Solution [mmol] | Type of Cation | Amount of Cation Component relative to 100 g of Electrolytic Solution [mmol] | Molecular Ratio of Cation Component relative to 1 mol of Doping-Capable Functional Group | ESR [Ω/100 kHz] Before Loading of Heat Stress | After Loading of Heat Stress |
| Example 28 | 0 | Benzoic Acid | 17 | Ammonia | 17 | 2.8 | 0.24 | 0.24 |
| Example 29 | 0 | | 17 | | 33 | 5.8 | 0.12 | 0.35 |
| Example 30 | 0 | | 17 | | 66 | 11.2 | 0.14 | 0.62 |
| Example 31 | 0 | | 17 | | 133 | 22.5 | 0.26 | 2.11 |
| Comparative Example 7 | 0 | | 17 | | 199 | 33.7 | 0.27 | 9.23 |
| Example 32 | 0 | 1,6-decane carboxylic Acid | 17 | Ammonia | 17 | 2.8 | 0.26 | 0.25 |
| Example 33 | 0 | | 17 | | 33 | 5.8 | 0.13 | 0.38 |
| Example 34 | 0 | | 17 | | 66 | 1.12 | 0.14 | 0.60 |
| Example 35 | 0 | | 17 | | 133 | 22.5 | 0.27 | 2.05 |
| Comparative Example 8 | 0 | | 17 | | 199 | 33.7 | 0.27 | 9.19 |
| Example 36 | 0 | Phthalic Acid | 17 | Ammonia | 17 | 2.8 | 0.28 | 0.30 |
| Example 37 | 0 | | 17 | | 33 | 5.8 | 0.15 | 0.40 |
| Example 38 | 0 | | 17 | | 66 | 11.2 | 0.16 | 0.72 |
| Example 39 | 0 | | 17 | | 133 | 22.5 | 0.30 | 2.42 |
| Comparative Example 9 | 0 | | 17 | | 199 | 33.7 | 0.31 | 9.91 |

As shown in Table 3, the solid electrolytic capacitors of examples 28 to 31 and comparative example 7 were produced by the same condition as examples 1 to 7 except that the anion component included in the liquid was benzoic acid and the amount of ammonia that is the cation component was changed. The solid electrolytic capacitors of examples 32 to 35 and comparative example 8 were produced by the same condition as examples 1 to 7 except that the anion component included in the liquid was 1,6-decanecarboxylic acid and the amount of ammonia that is the cation compoexamples 36 to 39 and comparative example 9, in which the anion components in the liquid was phthalic acid and the amount of phthalic acid was fixed. The sixth series shows the change in ESR after the reflow of the fifth series and is the series that includes examples 36 to 39 and comparative example 9, in which the anion components in the liquid was phthalic acid and the amount of phthalic acid was fixed.

As understood from Table 3 and FIG. 5, it was found that ESR of the solid electrolytic capacitor after the reflow got higher according to the increase in ammonia that is the cation components, and is not related to the types of the anion components in the electrolyte layer.

Furthermore, if the molecular ratio of ammonia relative to 1 mol of the doping-capable functional group was 2.8 or less, it was found that ESR after the reflow was equal to or less than the ESR before the reflow. Furthermore, if the molecular ratio of ammonia relative to 1 mol of the doping-capable functional group was more than 2.8 and 6 or less, it was found that ESR of the solid electrolytic capacitor did not cation component in the electrolyte layer were produced, the reflow process was performed to give the loading of heat stress, and ESR before and after the loading of heat stress was measured. Then, ESR of comparative examples were compared with the solid electrolytic capacitors of examples 1 to 7. The solid electrolytic capacitors of comparative examples 2 to 6 were produced by the same condition as examples 1 to 7 except that the cation component included in the liquid was triethylamine. The result is shown in below Table 4 together with examples 1 to 7.

TABLE 4

| | | Cations added to Solid Electrolyte layer | Composition of Electrolytic Solution | | Cations added to Electrolytic Solution | Total Amount in Electrolyte Layer | ESR [Ω/100 kHz] | |
|---|---|---|---|---|---|---|---|---|
| | | Molecular Ratio of | Amount of Anion | Amount of Cation | Molecular Ratio of | Molecular Ratio of | | |
| | Type of Cation Component | Cation Component relative to 1 mol of Doping-Capable Functional Group | Component relative to 100 g of Electrolytic Solution [mmol] | Component relative to 100 g of Electrolytic Solution [mmol] | Cation Component relative to 1 mol of Doping-Capable Functional Group | Cation Component relative to 1 mol of Doping-Capable Functional Group | Before Loading of Heat Stress | After Loading of Heat Stress |
| Example 1 | Ammonia | 0 | 17 | 4 | 0.7 | 0.7 | 0.54 | 0.16 |
| Comparative Example 2 | Triethylamine | 0 | 17 | 4 | 0.7 | 0.7 | 0.86 | 0.19 |
| Example 2 | Ammonia | 0 | 17 | 8 | 1.4 | 1.4 | 0.42 | 0.17 |
| Comparative Example 3 | Triethylamine | 0 | 17 | 8 | 1.4 | 1.4 | 0.50 | 0.19 |
| Example 3 | Ammonia | 0 | 17 | 17 | 2.8 | 2.8 | 0.26 | 0.26 |
| Comparative Example 4 | Triethylamine | 0 | 17 | 17 | 2.8 | 2.8 | 0.16 | 0.25 |
| Example 4 | Ammonia | 0 | 17 | 33 | 5.6 | 5.6 | 0.11 | 0.37 |
| Comparative Example 5 | Triethylamine | 0 | 17 | 33 | 5.6 | 5.6 | 0.10 | 2.51 |
| Comparative Example 6 | Triethylamine | 0 | 17 | 50 | 8.4 | 8.4 | 0.13 | 6.37 |
| Example 5 | Ammonia | 0 | 17 | 66 | 11.2 | 11.2 | 0.13 | 0.66 |
| Example 6 | Ammonia | 0 | 17 | 100 | 16.9 | 16.9 | 0.18 | 1.21 |
| Example 7 | Ammonia | 0 | 17 | 133 | 22.5 | 22.5 | 0.26 | 2.29 | change before and after the loading of heat stress. In addition, if the molecular ratio of ammonia relative to 1 mol of the doping-capable functional group was more than 6 and 11.4 or less, it was found that the increase in ESR of the solid electrolytic capacitor after the loading of heat stress was suppressed. Moreover, if the molecular ratio of ammonia relative to 1 mol of the doping-capable functional group was more than 11.4 and 23 or less, it was found that ESR of the solid electrolytic capacitor was significantly suppressed compared with comparative examples 7 to 9.

Thus, ESR of the solid electrolytic capacitor after the loading of heat stress relates to the total amount of the cation components including ammonia in the electrolyte layer relative to 1 mol of the doping-capable functional group. If the molecular ratio of the total of the cation components including ammonia is 23 or less, ESR after the loading of heat stress would be excellent. If the molecular ratio of the total of the cation components including ammonia is 11.4 or less, the increase in ESR of the solid electrolytic capacitor after the loading of heat stress can be suppressed. If the molecular ratio of the total of the cation components is 6 or less, ESR of the solid electrolytic capacitor after the loading of heat stress can be maintained low. If the molecular ratio of the cation component is 2.8 or less, ESR of the solid electrolytic capacitor after the loading of heat stress can be suppressed to be equal to or lower than ESR before the loading of heat stress.

Furthermore, the solid electrolytic capacitors of comparative examples 2 to 6 in which triethylamine was added as the As understood from examples 1 to 3 and comparative examples 2 to 4 in Table 4, if the molecular ratio of the cation component relative to 1 mol of the doping-capable functional group is 2.8 or less, ESR after the reflow were not so different and were suppressed low even when ammonia was included in the cation component or the cation component was other than ammonia. On the other hand, as understood from examples 4 to 7 and comparative examples 5 and 6 in Table 4, when ammonia was included as the cation component, ESR after the reflow had been largely suppressed even when the molecular ratio of the cation component relative to 1 mol of the doping-capable functional group was 5.6 or more and 23 or less. That is, when ammonia was included as the cation component, ESR can be largely suppressed at the molecular ratio of the cation component relative to 1 mol of the doping-capable functional group of up to 23.

Figure 6:
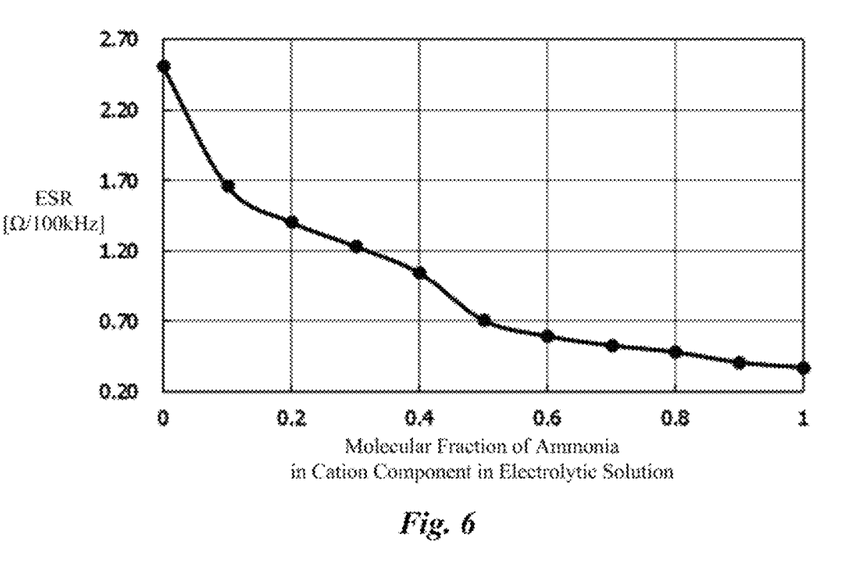
FIG. 6 is a graph illustrating a relationship between ESR after the reflow, and a molar fraction of ammonia in the cation component of an electrolytic solution.

Meanwhile, the solid electrolytic capacitors of examples 40 to 48 in which ammonia in addition to triethylamine was added as the cation component in the electrolyte layer were produced, the reflow process was performed to give the loading of heat stress, and ESR before and after the loading of heat stress was measured. Then, ESR of examples were compared with the solid electrolytic capacitors of comparative example 5 in which only trimethylamine was added and the solid electrolytic capacitors of example 4 in which only ammonia was added. The result is shown in Table 5. Furthermore, FIG. 6 is a graph illustrating a relationship between ESR after the reflow, and a molar fraction of ammonia in all the cation components included in the electrolytic solution (liquid) based on Table 5.

1 mol of the doping-capable functional group was the same as example 12. After the solid electrolytic capacitor was

TABLE 5

| | Cations added to Solid Electrolyte layer | Composition of Electrolytic Solution | | | Cations added to Electrolytic Solution | | ESR [Ω/100 kHz] | |
|---|---|---|---|---|---|---|---|---|
| | Molecular Ratio oF Cation Component relative to 1 mol of Doping-Capable Functional Group | Amount of Anion Component relative to 100 g of Electrolytic Solution [mmol] | Molecular Fraction in Cation Component in Electrolytic Solution | | Amount of Cation Component relative to 100 g of Electrolytic Solution [mmol] | Molecular Ratio of Cation Component relative to 1 mol of Doping-Capable Functional Group | Before Loading of Heat Stress | After Loading of Heat Stress |
| | | | Triethylamine | Ammonia | | | | |
| Comparative Example 5 | 0 | 17 | 1 | 0 | 33 | 5.6 | 0.10 | 2.51 |
| Example 40 | 0 | 17 | 0.9 | 0.1 | 33 | 5.6 | 0.11 | 1.66 |
| Example 41 | 0 | 17 | 0.8 | 0.2 | 33 | 5.6 | 0.10 | 1.41 |
| Example 42 | 0 | 17 | 0.7 | 0.3 | 33 | 5.6 | 0.10 | 1.23 |
| Comparative Example 6 | 0 | 17 | 0.6 | 0.4 | 33 | 5.6 | 0.11 | 1.04 |
| Example 44 | 0 | 17 | 0.5 | 0.5 | 33 | 5.6 | 0.11 | 0.70 |
| Example 45 | 0 | 17 | 0.4 | 0.6 | 33 | 5.6 | 0.11 | 0.59 |
| Example 46 | 0 | 17 | 0.3 | 0.7 | 33 | 5.6 | 0.11 | 0.53 |
| Example 47 | 0 | 17 | 0.2 | 0.8 | 33 | 5.6 | 0.10 | 0.48 |
| Example 48 | 0 | 17 | 0.1 | 0.9 | 33 | 5.6 | 0.11 | 0.41 |
| Example 4 | 0 | 17 | 0 | 1.0 | 33 | 5.6 | 0.11 | 0.37 |

As shown in Table 5, the solid electrolytic capacitor of comparative example 5, examples 40 to 48, and example 4 had different molar fraction of the cation component in the liquid. That is, the molar fraction of triethylamine and ammonia was changed by each 0.1 between the solid electrolytic capacitor of comparative example 1 in which the molar fraction of triethylamine was 1, and the solid electrolytic capacitor of example 4 in which the molar fraction of ammonia was 1. The solid electrolytic capacitor of comparative example 5 and examples 40 to 48 were produced by the same condition as example 4 except for this molecular fraction.

FIG. 6 is a graph illustrating a relationship between ESR after the reflow, and a molar fraction of ammonia in all the cation components included in the electrolytic solution (liquid) based on Table 5. As understood from Table 5 and FIG. 6, it was found that ESR after the loading of heat stress can be suppressed low as long as ammonia was included in the electrolyte even when other cation components were included. Furthermore, it was found that if the molecular fraction of ammonia in all the cation component included in the solid electrolyte layer was 0.1 or more, ESR after the loading of heat stress was largely suppressed, if said molecular fraction was 0.5 or more, ESR after the loading of heat stress was further largely suppressed, if said molecular fraction was 0.9 or more, ESR after the loading of heat stress was significantly suppressed, and it was particularly preferable that said molecular fraction is 1.0.

To check if the tendency of ESR before and after the loading of heat stress would be similar even when the amount of PEDOT/PSS in the solid electrolytic capacitor, the solid electrolytic capacitor of example 28 was produced as follows. The solid electrolytic capacitor of example 28 was produced in the same production method as example 12 except that the process of immersing the capacitor element in the dispersion of the conductive polymer and drying the capacitor element was repeated for six times. That is, the molecular ratio of the cation component in the solid electrolyte layer and the electrolytic solution (liquid) relative to produced, the amount of PEDOT/PSS in the solid electrolytic capacitor was measured and was 1.3 mg. Similarly to example 12, ESR at 20° C. and ESR of the produced solid electrolytic capacitor after the reflow process at the peak temperature of 260° C. were measured. ESR were measured at 100 kHz.

In example 28, ESR before the loading of heat stress was 0.05Ω and ESR after the loading of heat stress was 0.05Ω, such that ESR was the same before and after the loading of heat stress. In example 12, ESR was also the same before and after the loading of heat stress. From this result, ESR before and after the loading of heat stress almost does not change even in the case in which the amount of PEDOT/PSS was increased from 0.6 mg to 1.3 mg as long as the molecular ratio of the cation component in the solid electrolyte layer relative to 1 mol of the doping-capable functional group was the same. Accordingly, the tendency of ESR before and after the loading of heat stress would be the same even when the amount of PEDOT/PSS was increased.

The production method of the solid electrolytic capacitor of the present disclosure is not limited to the indicated examples. For example, ESR of the solid electrolytic capacitor may be significantly reduced by adding additives to the dispersion of the conductive polymer or by increasing the repetition number of the process of immersing the capacitor element in the dispersion of the conductive polymer and drying the capacitor element.

Furthermore, ESR of the electrolytic capacitor only using the electrolytic solution as the electrolyte is easily affected by the electrical conductivity of the electrolytic solution, and generally, ESR tends to increase as the electrical conductivity of the electrolytic solution gets lower. However, ESR of the electrolytic capacitor of the present disclosure including the solid electrolyte layer and the electrolytic solution is less affected by the electrical conductivity of the electrolytic solution. In other words, ESR of the product can be made sufficiently small even when the electrical conductivity of the electrolytic solution is low. The reason for this is because the electrical conductivity of the conductive polymer used in the solid electrolytic capacitor is incomparably higher compared to the electrical conductivity of the electrolytic solution, such that the electrical conductivity of the conductive polymer greatly affect ESR.

The invention claimed is:

1. A solid electrolytic capacitor comprising:
   a capacitor element formed by opposing an anode foil and a cathode foil; and
   an electrolyte layer formed in the capacitor element, wherein:
   the electrolyte layer comprises:
   a solid electrolyte layer including a dopant and a conjugated polymer; and
   a liquid filled in air gaps in the capacitor element on which the solid electrolyte layer is formed,
   the electrolyte layer has a cation component that includes ammonia,
   the cation component is included only in the liquid,
   a molecular ratio of the cation component relative to 1 mol of a functional group of the dopant in the electrolyte layer is 23 or less, the functional group being a group which can contribute to a doping reaction of the dopant, and
   the ammonia is included in the electrolyte layer in a molar fraction of 0.1 or more of the cation component in the electrolyte layer.

2. The solid electrolytic capacitor according to claim 1, wherein:
   the molecular ratio of the cation component relative to 1 mol of the functional group in the electrolyte layer is 11.4 or less.

3. The solid electrolytic capacitor according to claim 1, wherein:
   the molecular ratio of the cation component relative to 1 mol of the functional group in the electrolyte layer is 6 or less.

4. The solid electrolytic capacitor according to claim 1, wherein the ammonia is included in the electrolyte layer in a molar fraction of 0.5 or more of all the cation component in the electrolyte layer.

5. The solid electrolytic capacitor according to claim 1, wherein the dopant is polystyrene sulfonic acid.

6. The solid electrolytic capacitor according to claim 1, wherein the liquid includes ethylene glycol.

7. The solid electrolytic capacitor according to claim 6, wherein 50% or more of the liquid is ethylene glycol.

8. The solid electrolytic capacitor according to claim 1, wherein:
   the molecular ratio of the cation component relative to 1 mol of the functional group in the electrolyte layer is 2.8 or less.

9. A solid electrolytic capacitor comprising:
   a capacitor element formed by opposing an anode foil and a cathode foil; and
   an electrolyte layer formed in the capacitor element, wherein:
   the electrolyte layer comprises:
   a solid electrolyte layer including a dopant and a conjugated polymer; and
   a liquid filled in air gaps in the capacitor element on which the solid electrolyte layer is formed, and
   the electrolyte layer has a cation component that includes ammonia,
   a molecular ratio of the cation component relative to 1 mol of a functional group of the dopant in the electrolyte layer is 23 or less, the functional group being a group which can contribute to a doping reaction of the dopant, and
   the molecular ratio of ammonia relative to 1 mol of the functional group which can contribute to the doping reaction of the dopant is 0.2 or more.

10. The solid electrolytic capacitor according to claim 9, wherein:
    the molecular ratio of the cation component relative to 1 mol of the functional group in the electrolyte layer is 11.4 or less.

11. The solid electrolytic capacitor according to claim 9, wherein:
    the molecular ratio of the cation component relative to 1 mol of the functional group in the electrolyte layer is 6 or less.

12. The solid electrolytic capacitor according to claim 9, wherein:
    the molecular ratio of the cation component relative to 1 mol of the functional group in the electrolyte layer is 2.8 or less.

13. A solid electrolytic capacitor comprising:
    a capacitor element formed by opposing an anode foil and a cathode foil; and
    an electrolyte layer formed in the capacitor element, wherein:
    the electrolyte layer comprises:
    a solid electrolyte layer including a dopant and a conjugated polymer; and
    a liquid filled in air gaps in the capacitor element on which the solid electrolyte layer is formed,
    the electrolyte layer has a cation component that includes ammonia,
    the cation component is included in both the solid electrolyte layer and the liquid,
    a molecular ratio of a total of the cation component in the solid electrolyte layer and the liquid relative to 1 mol of a functional group of the dopant in the electrolyte layer is 23 or less, the functional group being a group which can contribute to a doping reaction of the dopant, and
    the ammonia is included in the electrolyte layer in a molar fraction of 0.1 or more of the cation component in the electrolyte layer.

14. The solid electrolytic capacitor according to claim 13, wherein:
    the molecular ratio of the cation component relative to 1 mol of the functional group in the electrolyte layer is 11.4 or less.

15. The solid electrolytic capacitor according to claim 13, wherein:
    the molecular ratio of the cation component relative to 1 mol of the functional group in the electrolyte layer is 6 or less.

16. The solid electrolytic capacitor according to claim 13, wherein:
    the molecular ratio of the cation component relative to 1 mol of the functional group in the electrolyte layer is 2.8 or less.

* * * * *